Patented May 19, 1931

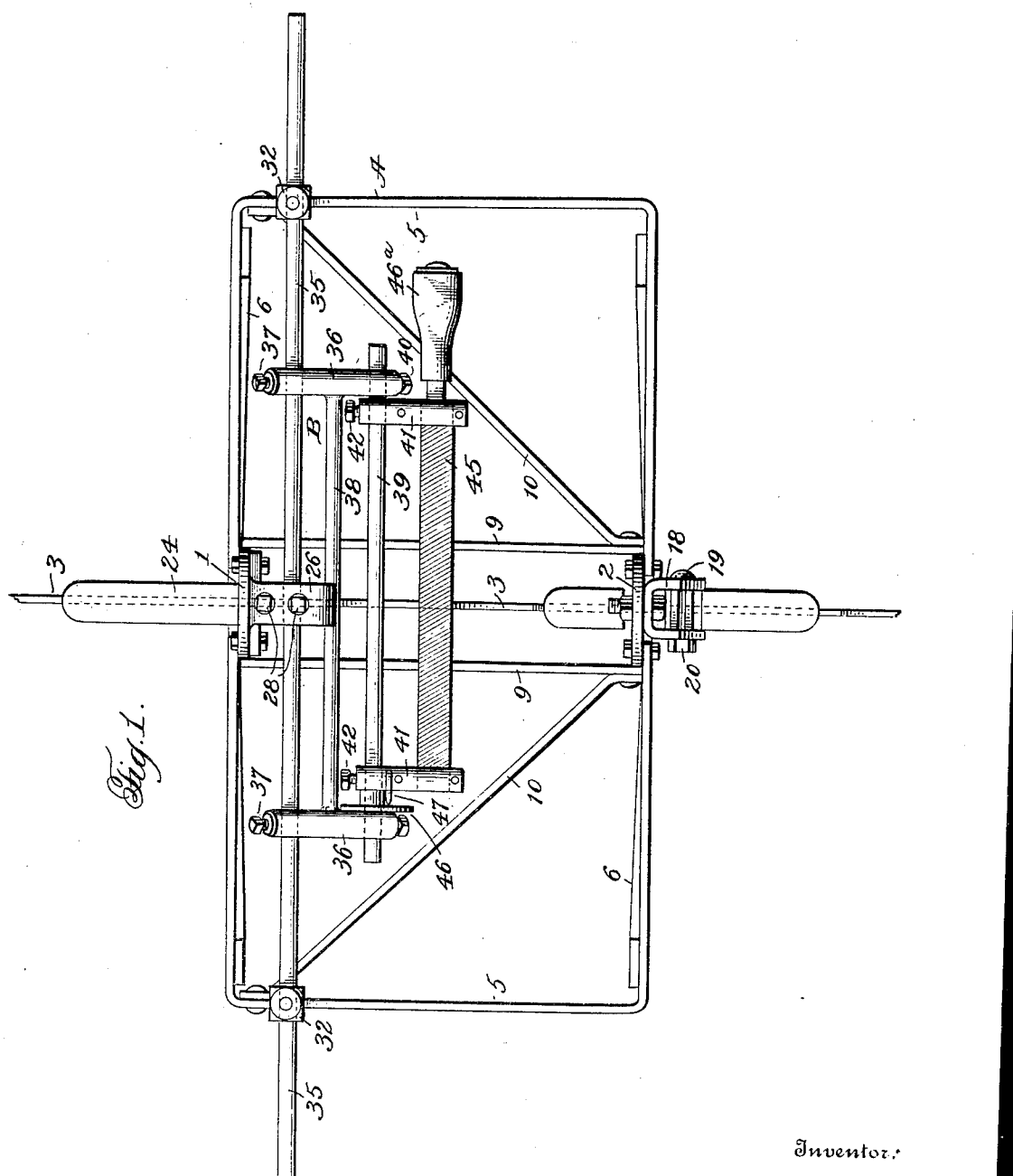

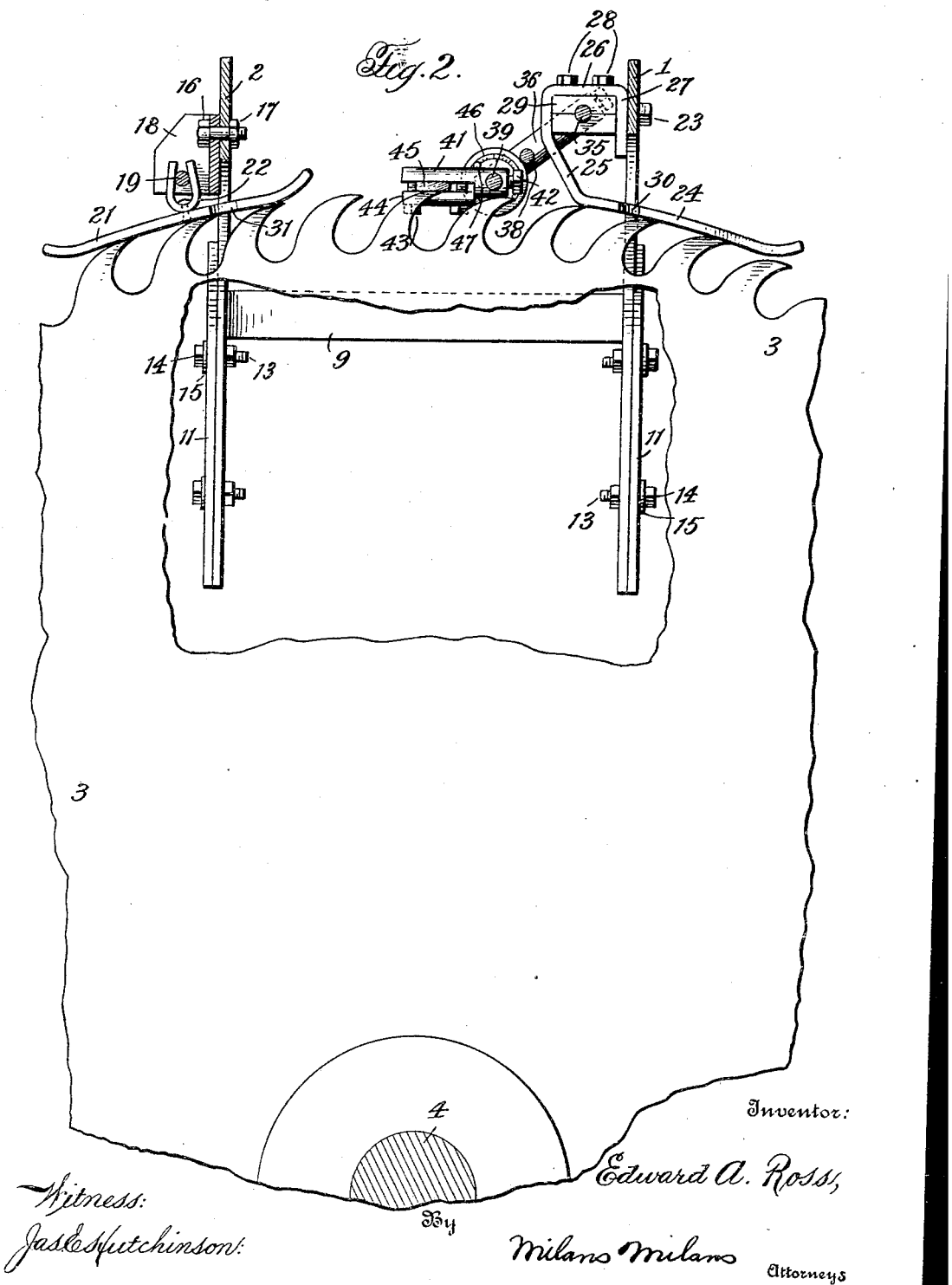

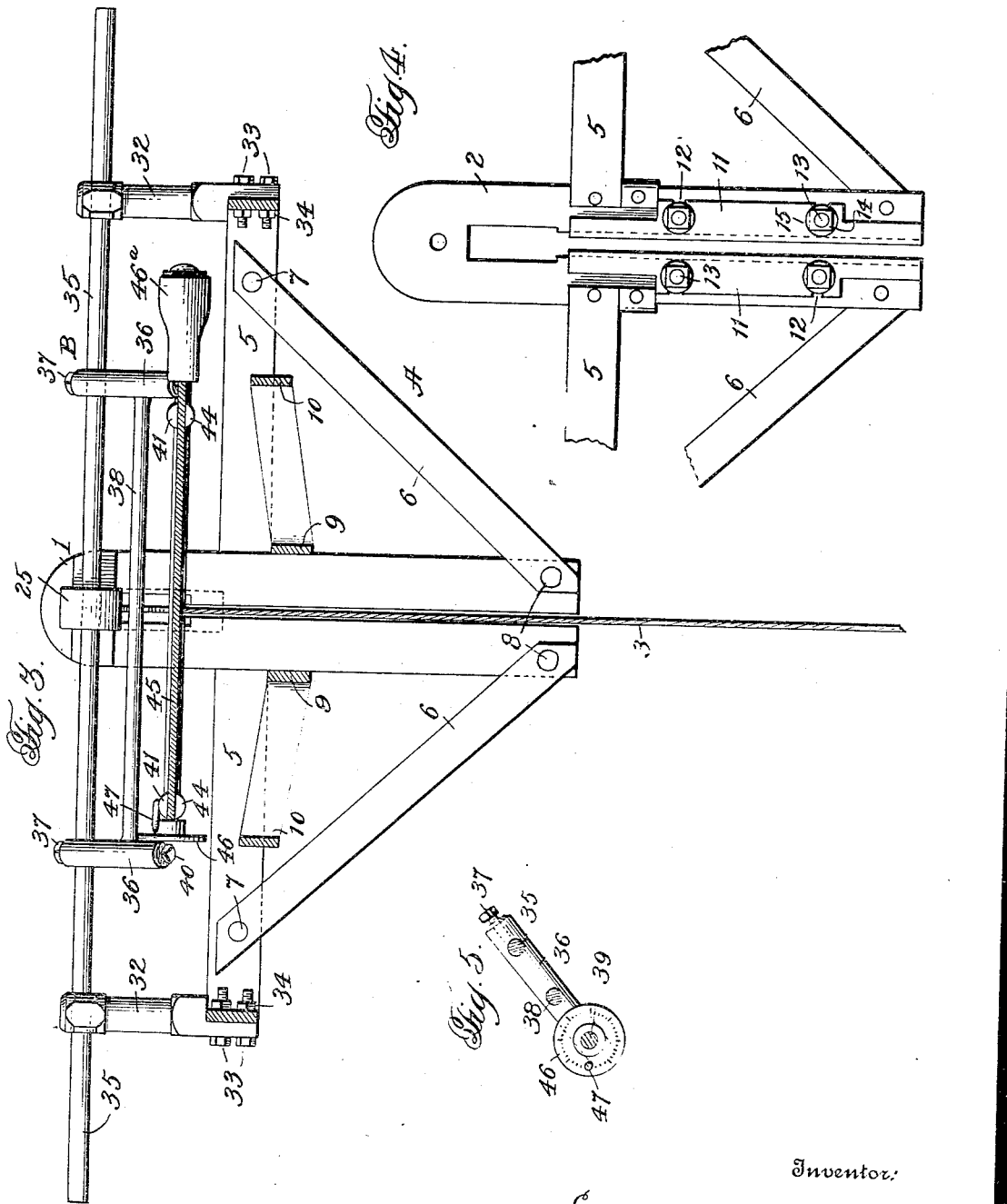

1,806,222

UNITED STATES PATENT OFFICE

EDWARD A. ROSS, OF GERNT, TENNESSEE

SAW FILER

Application filed February 28, 1925. Serial No. 12,313.

My invention relates to new and useful improvements in a saw filer adapted to file all kinds of chisel tooth, circular, and band saws, the principal object of the invention residing in the provision of a filer of the character described in which a file of well-known or common construction may be used and operated by hand, the file being detachably connected to its carrying frame, the frame being mounted for swinging movement to engage the file with the teeth of the saw and the file being connected to the carrying frame for angular adjustment to secure the proper pitch or engagement with the teeth.

Another object of the invention resides in the provision of a supporting frame which is adapted to be set over the saw and supported thereby, said frame having yieldable and adjustable arms which engage the teeth of the saw and bearings for supporting the file carrying frame for slidable and swinging movement.

A further object of the invention consists in providing the supporting frame with adjustable plate or gauge members which will engage the side faces of the saw blade and thereby hold the frame steady for operation, the adjustable plates or gauge members thereby adapting the use of the filer in connection with saw blades of various thicknesses.

With the above and other objects in view, which will appear as the description proceeds, my invention consists in the novel details of construction, and arrangement of parts, described in the following specification, and illustrated in the accompanying drawings, and while I have illustrated and described the preferred embodiments of the invention, as they now appear to me, it will be understood that such changes may be made as will fall within the scope of the appended claims.

In the drawings:

Fig. 1 is a top plan.

Fig. 2 is a side elevation showing the filer mounted upon a saw blade, parts being in vertical section, and parts of the saw being broken away.

Fig. 3 is a longitudinal vertical section with parts shown in elevation.

Fig. 4 is a fragmental detail of a portion of the supporting frame, and

Fig. 5 is a detail, partly in section, showing the dial for indicating the adjustment of the file.

In the drawings A denotes generally the supporting frame and B the file carrying frame mounted on the supporting frame for slidable and swinging movement. The supporting frame includes the inverted U-shaped members 1 and 2 which are adapted to fit over the saw blade as more particularly illustrated in Figs. 2 and 3 of the drawings, the saw blade indicated at 3 being in the instance shown as of a circular type mounted on and carried by the shaft or mandrel 4. Secured to the members 1 and 2 are the horizontal frames 5 which are supported by the diagonally extending brace bars 6, the upper ends of the brace bars being connected at 7 to the frames and the lower ends being connected at 8 adjacent the lower ends of the members 1 and 2. The members 1 and 2 are connected together by the horizontal bars 9 and between these bars 9 and the outer ends of the frames 5 are the diagonally extending braces 10 as more particularly shown in Figs. 1 and 3 of the drawings. Secured to the outer faces of each of the members 1 and 2, on each side of the slot formed in the members, are the plates or gauges 11, more particularly illustrated in Fig. 4 of the drawings, and each of the plates or gauges 11 is provided with the vertically spaced notches 12 into which the bolts 13 are adapted to pass the bolts receiving the nuts 14 and washers 15. The bolts and nuts secure the plates or gauges to the members 1 and 2 and it can readily be appreciated that through means of the notches 12 the plates may be adjusted to vary the distance between the inner vertical edges thereof so as to engage the side faces of saw blades of varying thicknesses. As quite clearly illustrated in Fig. 4 of the drawings the inner vertical edges of the plates or gauges 11 will overlie the slots formed in the members 1 and 2. Secured to the outer face of the member 2, by means of the bolts 16 and nuts 17, is the bracket 18 having the transversely extending rod 19, said rod being in the form of a threaded bolt receiving the nut 20 as more particularly illustrated in Fig. 1 of the drawings. This rod or bolt 19 supports the arm or plate 21 through means of the upwardly extending U-shaped bracket or bearing through which the rod or bolt passes as shown more particularly in Fig. 2 of the drawings, and it can readily be appreciated that the arm or plate may be swung to various angles to properly engage the saw teeth and will be held at such adjusted position when the nut 20 is tightened upon the bolt it being appreciated that the bracket 18 is of sufficient resiliency to allow the arms thereof, between which the bracket or bearing 22 extends, to engage the ends of the bracket or bearing 22. Secured to the member 1 by means of the bolts 23, or other suitable fasteners, is the arm or plate 24 which is adapted to engage the saw teeth as more particularly illustrated in Fig. 2 of the drawings. This arm or plate 24 has the upwardly extending portion 25, the horizontal portion 26, and the vertically extending portion 27, the bolts 23 passing through said vertically extending portion 27 to secure the arm or plate to the member 1. Secured between the upwardly extending portion 25 and the vertically extending portion 27, and beneath the horizontal portion 26, by means of the bolts 28, is the bearing 29 for a purpose to be later described, the bearing being preferably formed of two blocks or plates as more particularly illustrated in Fig. 2 of the drawings. The arm or plate 24 passes through the slot formed in the member 1 and is provided on each side edge with a notch 30 to receive the vertically extending edges of the member 1 adjacent the slot. The arm or plate 21 is provided in each side edge with a notch 31 to receive the vertically extending edges of the member 2 adjacent the slot therein, the arm or plate extending through the slot as is quite clearly shown. Supported on the outer end of each of the horizontally extending frames 5 is a vertically extending post or standard 32 having a horizontally extending opening adjacent the upper end for a purpose which will later appear. The posts or standards are secured to the horizontal frames by means of the bolts 33 and nuts 34.

The file carrying frame B includes the horizontally extending rod 35 which is supported by the posts or standards 32 by passing the rod through the horizontally extending openings formed adjacent the upper ends thereof, the rod also passing through the bearing 29. The rod 35 is mounted for both slidable and rotatable movement and secured to the rod between the posts or standards 32 are the arms 36 which have openings through which the rod passes. The arms 36 are secured to the rod 35 by the screws or bolts 37 and it can readily be appreciated that the arms may be adjusted angularly or longitudinally upon the rod 35. The arms are connected together by means of the rod 38 and carried by the arms is the horizontal rod 39 which passes through openings formed in the arms and it is held in its adjusted positions by means of the bolts or screws 40, which pass through the ends of the arms. When the screws or bolts 40 are loosened the rod 39 may be longitudinally adjusted or rotated relative to the arms. Secured upon the rod 39 are the file clamps which include the upper members 41, of the shape shown more particularly in Fig. 2 of the drawings, said members 41 having an opening therethrough for the rod 39 and held in position by means of the bolt or screw 42. By loosening the bolts or screws 42 the members 41 may be adjusted longtudinally of the rod 39 or angularly adjusted relative thereto. Secured to the members 41 by means of the bolts or screws 43 are the plates 44 and the file 45 is adapted to be secured between the members 41 and plates 44 as more particularly illustrated in Figs. 1 and 2 of the drawings. The file 45 is of common or well-known construction provided with a hand hold 46ª at one end. Secured upon the rod 39 is a dial 46 and secured to one of the file clamps, adjacent the dial, is a pointer 47. The dial will be suitably graduated and cooperates with the pointer 47 to indicate the degree of adjustment of the file.

From the above detail description it is thought that the manner of using my improved form of filer will be apparent. The supporting frame is adapted to be positioned over the saw blade as shown in the drawings and is supported entirely by the saw blade itself by engagement of the plates or arms 21 upon the teeth of the blade. The blade will extend up into the slots formed in the members 1 and 2 and the gauge or plate members 11 carried by the members 1 and 2 will be adjusted to engage the side faces of the blade. The file is secured in the clamps and may be angularly adjusted upon the rod 39 by loosening the screws or bolts 42 so that the face of the file will properly engage the saw teeth. The file frame may be swung as a unit by rotation of the rod 35 in the posts or standards 32 and the arms 36 of the file carrying frame may be adjusted either longitudinally or angularly with respect to the rod 35 by loosening the bolts or screws 37. With the file carrying frame swung downwardly the file will engage the teeth of the saw and then by grasping the hand hold 46 of the file the entire file carrying frame may be reciprocated backwardly and forwardly by means of the rod 35 sliding in the posts or standards 32. In the drawings I have illustrated the operation of the filer in connection with a circular saw which remains mounted upon its shaft or mandrel and the teeth are successively brought into position for operation upon by the file by rotating the saw. If other types of saws are to be operated upon they may be mounted upon or clamped to suitable supports but in all instances the supporting frame of the filer is mounted directly upon the saw blade.

From the above it will be seen that I have provided a filer in which the ordinary or common form of file may be used and operated entirely by hand, the filer being supported directly upon the saw blade and the file mounted for various adjustments being free for swinging movement for raising out of engagement with the saw teeth or lowered to engage the teeth. The plate or arm 24 which engages the saw teeth is of sufficient resiliency to yield and assume the proper level for engagement with the teeth of different types of saws. The plate or arm 21 is readily adjustable to properly engage the teeth of different types of saws. By means of the pointer 47 and dial 46 an indication of the adjustment of the file may be secured.

Having fully described my invention what I claim as new and desire to secure by Letters Patent is:

1. A saw filer including a pair of spaced members having slots to receive the saw, a horizontal frame carried by said members, a yieldable arm secured to one of the members, a bracket secured to the other of the members, a yieldable arm suspended from the bracket and connected thereto for swinging movement, said arms extending longitudinally of the edge of the saw and engageable therewith at spaced points, a file, and means for connecting the file to the frame for sliding movement and for engagement with the teeth of the saw.

2. A saw filer including a pair of spaced members having slots to receive the saw, a horizontal frame carried by said members, a yieldable arm secured to one of the members, a bracket secured to the other of the members and having spaced arms, a bolt extending through the arms of the bracket and supported thereby, a yieldable arm suspended from the bolt and adapted for swinging movement, said yieldable arms extending longitudinally of the edge of the saw and engageable therewith at spaced points, a file, and means for connecting the file to the frame for sliding movement and for engagement with the teeth of the saw.

In testimony whereof I hereunto affix my signature.

EDWARD A. ROSS.